(12) United States Patent
Sekikawa et al.

(10) Patent No.: US 8,845,012 B2
(45) Date of Patent: Sep. 30, 2014

(54) VEHICLE FRONT HOOD STRUCTURE

(75) Inventors: Mai Sekikawa, Wako (JP); Masato Ishibashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/990,870

(22) PCT Filed: Jan. 6, 2012

(86) PCT No.: PCT/JP2012/000048
§ 371 (c)(1),
(2), (4) Date: May 31, 2013

(87) PCT Pub. No.: WO2012/117653
PCT Pub. Date: Sep. 7, 2012

(65) Prior Publication Data
US 2013/0241241 A1 Sep. 19, 2013

(30) Foreign Application Priority Data
Mar. 2, 2011 (JP) ................................. 2011-045696

(51) Int. Cl.
*B62D 25/10* (2006.01)
*B60R 21/34* (2011.01)

(52) U.S. Cl.
CPC .............. *B62D 25/105* (2013.01); *B60R 21/34* (2013.01); *B60R 2021/343* (2013.01)
USPC ................................... 296/193.11; 180/69.21

(58) Field of Classification Search
CPC ..................... B60R 2021/34; B60R 2021/343; B60R 21/34; B62D 25/10; B62D 25/105
USPC .......................... 296/193.11; 180/69.2, 69.21
See application file for complete search history.

(56) References Cited

U.S. PATENT DOCUMENTS 6,048,022 A * 4/2000 Ishibashi et al. ......... 296/187.09
7,354,101 B2 * 4/2008 Donabedian et al. .... 296/193.11

FOREIGN PATENT DOCUMENTS

| DE | 102005044818 | | 4/2007 |
|----|------|---|------|
| EP | 0838389 | | 4/1998 |
| EP | 2019025 | * | 1/2009 |
| JP | 11-091627 | | 4/1999 |
| JP | 11-208511 | | 8/1999 |
| JP | 2000-168622 | | 6/2000 |
| JP | 2005-178422 | | 7/2005 |
| JP | 2005-186766 | | 7/2005 |
| JP | 2006-044311 | | 2/2006 |
| JP | 3829715 | | 10/2006 |

OTHER PUBLICATIONS

European Search Report dated Jul. 10, 2014, 6 pages.

* cited by examiner

*Primary Examiner* — Dennis H Pedder
(74) *Attorney, Agent, or Firm* — Rankin, Hill & Clark LLP (57) ABSTRACT

A hood frame is provided with a center bead, front radiating beads and rear radiating beads to ensure that the front hood bends in the shape of inverted letter-V under a frontal crash load. Further, the beads provide the hood frame with a stiffness (including an out-of-plane stiffness) which is required of the front hood while the downward deformation of the hood frame under a downward load can be controlled and the HIC level can be set at an appropriate level.

16 Claims, 6 Drawing Sheets

VEHICLE FRONT HOOD STRUCTURE

TECHNICAL FIELD

The present invention relates to a hood structure for a vehicle, and in particular to a hood frame structure provided on the back side of a hood skin.

BACKGROUND OF THE INVENTION

A double layered structure is known that includes a hood skin (outer panel) and a hood frame (inner panel) which is attached to the back side of the hood skin as a front hood that covers an upper part of an engine room of a motor vehicle. In such a front hood structure, the hood frame may be formed with a number of dimples and/or through holes with the aim of achieving a favorable HIC (head injury criterion) level while ensuring a required out-of-plane stiffness of the front hood. See Patent Documents 1 and 2.

PRIOR ART DOCUMENT(S)

Patent Document(s)

Patent Document 1: JP2000-168622A
Patent Document 2: JP3829715B

BRIEF SUMMARY OF THE INVENTION

Task to be Accomplished by the Invention

However, in the conventional front hood, because the dimples or the combination of dimples and through holes are individually arranged, and there is no continuity in the transmission of loading. Therefore, the conventional front hood is not able to transmit a vertical load on the hood to the entire area of the hood frame so that the crash load cannot be supported in an optimum fashion.

When the input of the vertical load on the hood is great, for the loading to be favorably absorbed by the front hood, the front hood is required to deflect downward without striking components in the engine room such as a cylinder head cover and engine intake components. In other words, a relatively large crash stroke or a relatively large vertical gap is required to be defined between the front hood and the components in the engine room. This necessitates the height (elevation) of the hood to be increased, and impairs the front visibility of the vehicle. Furthermore, the resulting increase in the front projected area of the vehicle body impairs the aerodynamic performance of the vehicle, and adversely affects fuel economy.

The front hood is also desired to be able to absorb the heavy load that acts thereupon at the time of a frontal crash by bending in the shape of inverted letter-V so that the front hood is prevented from intruding into the cabin and the space within the cabin is ensured even at such a time. However, the conventional front hood may not be adequately configured to bend in the shape of inverted letter-V with a frontal crash load and reduce the crash stroke of the front hood with respect to a downward load acting upon the front hood with appropriate selection of the sizes and arrangement of dimples and through holes.

A primary object of the present invention is to ensure the front hood to bend in the shape of inverted letter-V under a frontal crash load, and give the front hood a required out-of-plane stiffness while controlling the downward deformation of the hood frame under a downward load and achieving an appropriate HIC level at the same time.

Means to Accomplish the Task

The present invention provides a vehicle front hood structure, comprising a hood skin (10) and a hood frame (20) attached to a back side of the hood skin (10), the hood frame (20) comprising: a center bead (22) projecting toward the hood skin and extending from an intersection (C) between a connecting line (L1) connecting a pair of folding points (A) defined centrally in a fore and aft direction on either side edge of the hood frame (20) and a laterally central line (L2) outwardly in either lateral direction; and a plurality of radiating beads (26, 28) projecting toward the hood skin and extending diagonally both in front of and behind the center bead (22) in a diagonal direction of the hood frame.

According to this structure, the center beam (22) and the radiating beams (26, 28) jointly ensure that the front hood bends in the shape of inverted letter-V under a frontal crash load, provide a stiffness (including an out-of-plane stiffness) which is required of the front hood while the center bead (22) transmits a downward load on the front hood to laterally outer sides thereof in an initial stage, and the radiating beads (26, 28) distribute this load to a wide area of the hood frame (1). Owing to this structure, the HIC is controlled in such a manner that the HIC is appropriately selected and the downward deformation of the hood frame under a downward load on the hood can be controlled (reduction of the crash stroke) at the same time.

In the vehicle front hood structure of the present invention, the center bead (20) and/or the radiating beads (26, 28) are preferably given with a semicircular cross section.

According to this arrangement, the concentration of stress in the base portion of each bead can be avoided, and the transmission of load from each bead to the adjoining planar sections can be accomplished in a favorable manner.

In the vehicle front hood structure of the present invention, the center bead (22) preferably extends continuously in the lateral direction.

According to this structure, the downward load acting upon the hood can be transmitted to outer sides via the center bead (22) in an initial stage, and the HIC is controlled in such a manner that the HIC is appropriately selected and the downward deformation of the hood frame under the downward load on the hood can be controlled (reduction of the crash stroke) at the same time.

In the vehicle front hood structure of the present invention, the hood frame (20) preferably includes a planar section (20A) having a prescribed width (c) and not formed with a bead which is located between each lateral end of the center bead (22) and the opposing side edge of the hood frame (20).

According to this structure, the out-of-plane stiffness of the planar section (20A) not formed with the center bead (22) can be appropriately determined.

In the vehicle front hood structure of the present invention, the hood frame (20) preferably includes a connecting portion (26A, 28A, 32, 34) at which a laterally adjoining pair of the radiating beads (26, 28) in a laterally central part of the hood frame (20) is connected to each other.

According to this structure, the downward load acting upon the hood, in particular the load applied to a laterally middle part of the hood can be distributed to the entire area of the hood frame (20) in a favorable manner.

In the vehicle front hood structure of the present invention, the hood frame (20) preferably includes a planar section (20B) having a prescribed width (d) and not formed with a bead which is located between the center bead (22) and an opposing end of each front radiating bead (26).

According to this structure, because the planar section (20B) functions as a low mechanical strength part, and buckles under a frontal crash load, the load can be absorbed in an appropriate manner. Also, because the planar section (20B) of the hood frame (20) undergoes a tensile deformation under a downward load applied to the front hood, the load can be absorbed in an appropriate manner.

In the vehicle front hood structure of the present invention, the hood frame (20) preferably includes a dimple (30) formed in a region which is not provided with a bead and located laterally and/or longitudinally central part thereof.

According to this structure, the out-of-plane stiffness of the planar section not formed with a bead can be set to an appropriate level by the dimple (30).

Effect of the Invention

According to the vehicle front hood structure of the present invention, as the hood frame is provided with a center bead extending laterally and centrally in a fore and aft direction and a plurality of radiating beads extending diagonally both in front of and behind the center bead in a diagonal direction of the hood frame, the front hood is ensured to bend in the shape of inverted letter-V under a frontal crash load and is provided with a stiffness (including an out-of-plane stiffness) which is required of the front hood while the beads distribute the downward load on the front hood to a wide area of the hood frame such that the downward deformation of the hood frame under a downward load can be controlled (reduction of the crash stroke) and the HIC level can be set at an appropriate level at the same time.

DETAILED DESCRIPTION OF THE PREFERRED EMBODIMENT(S)

An embodiment of the vehicle front hood structure according to the present invention is described in the following with reference to FIGS. 1 and 2.

A front hood 1 is configured to cover an upper end of an engine room defined in a front part of a vehicle, and comprises an outer panel consisting of a hood skin 10 made of steel plate and a hood frame 20 made of steel plate and attached to the back side (lower bottom surface facing the engine room) 10A of the hood skin 10.

The hood skin 10 is given with a substantially rectangular shape, and is fixedly provided with a pair of hinge members 12 on either side part (adjacent to the side edge of the hood skin 10) of the rear end of the backside 10A thereof that connect the hood skin 10 to a vehicle body (such as structural members defining tire houses).

A striker 14 for detachably engaging (locking) the front hood 1 to the vehicle body is provided in a middle part of the front end of the back side 10A of the front hood 1. The hood skin 10 is supported by a plurality of frusto-conical elastic support members (not shown in the drawings) fixed to the upper end of a bulkhead in a front part of the vehicle body and the upper end of the fenders at a plurality of points of the peripheral part of the back side 10A of the hood skin 10.

The hood frame 20 is given with a rectangular shape, and is attached to the back side 10A of the hood skin 10. The hood frame 20 is formed with a center bead 22 which protrudes toward the back side 10A of the hood skin 10 and extends from an intersection C between a connecting line L1 connecting a pair of folding points A defined centrally in a fore and aft (longitudinal) direction on either side edge of the hood frame and a laterally central line L2 outwardly in either lateral direction (see FIG. 4), and continuously extends linearly in a lateral direction along a longitudinally central part of the hood frame 20 to a point short of each side edge of the hood frame 20 by a distance c. Therefore, a planar section 20A that does not include a bead extends laterally by a width c.

Figure 3:
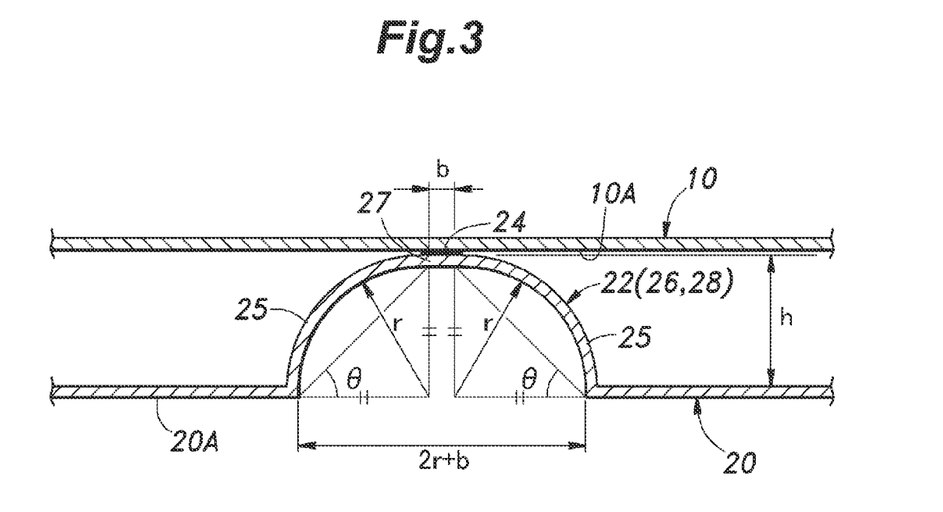
FIG. 3 is a sectional view of a bead of the vehicle front hood structure embodying the present invention.

The cross sectional shape of the center bead 22 is formed by a flat top section 27 having a lateral width of b and a pair of quarter circles 25 arranged symmetrically on either side of the flat top section 27 as shown in FIG. 3. Therefore, the cross sectional shape defines a semicircle (arch) having a bead height h corresponding to the radius r of the quarter circles 25. Each quarter circle 25 defines an arc extending over a 90 degree angle, and circumscribes an isosceles right triangle defining an elevation angle of 45 degrees. The width of the open end of the center bead 22 is therefore given by (2r+b).

The hood frame 20 further includes a plurality of stamp formed front radiating beads 26 and rear radiating beads 28 that extend diagonally in front of and behind the center bead 20, respectively.

In the illustrated embodiment, the front radiating beads 26 protrude toward the back side 10A of the hood skin 10, and are arranged symmetric about the laterally central line such that the front radiating beads 26 extend obliquely from the center to each side as one moves forward. The rear radiating beads 28 are likewise arranged symmetric about the laterally central line such that the rear radiating beads 28 extend obliquely from the center to each side as one moves rearward.

Figure 1:
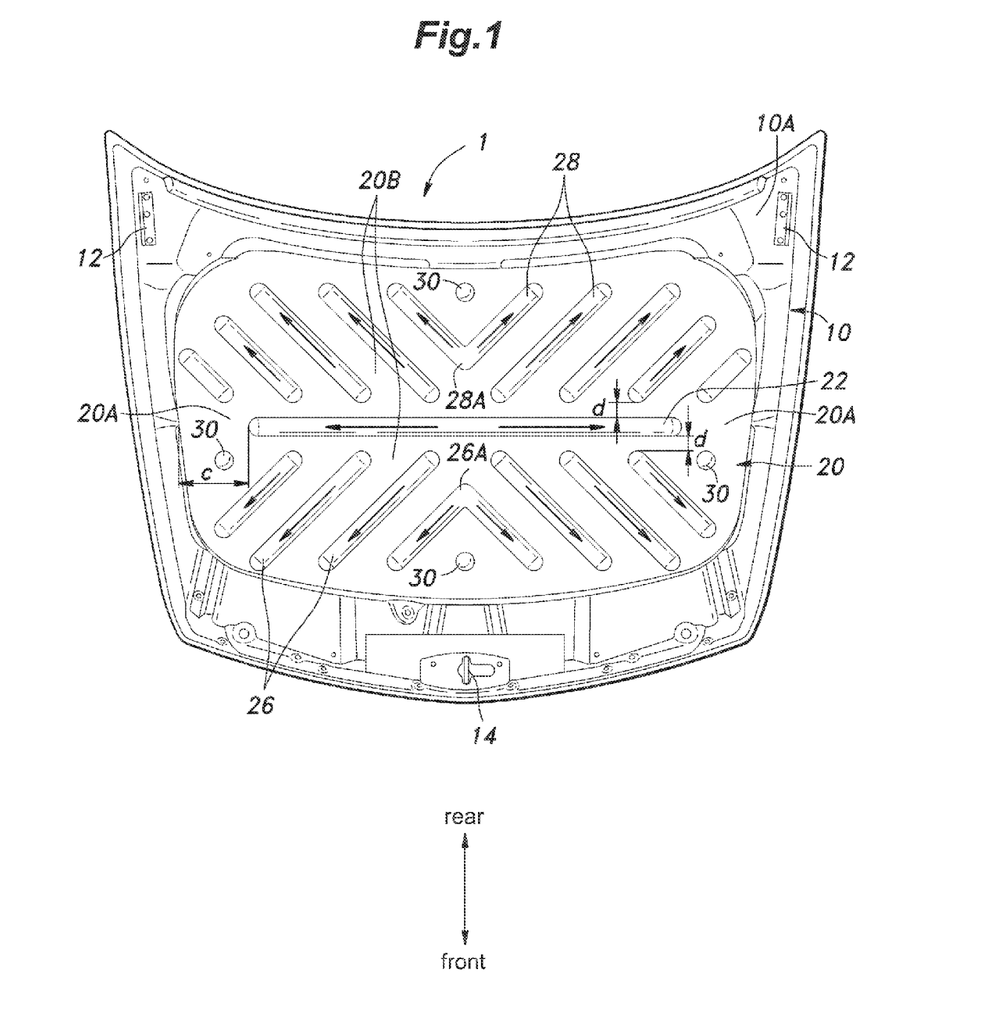
FIG. 1 is a plan view of the back side of a hood in a vehicle front hood structure embodying the present invention.
Figure 2:
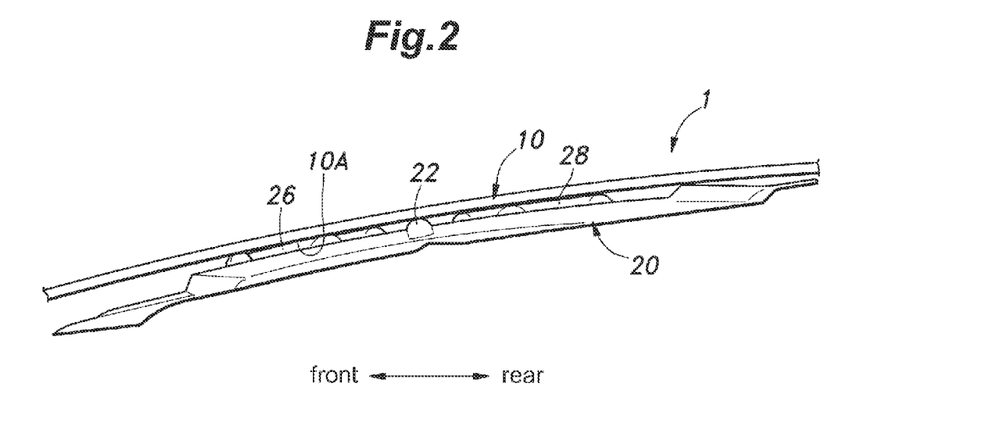
FIG. 2 is a side view of an essential part of the vehicle front hood structure embodying the present invention.

The two of the front radiating beads 26 that adjoin each other at the laterally central part of the hood frame 20 are joined to each other at the center bead side ends thereof such that the shape of inverted letter-V is defined as seen in FIG. 1. The center bead ends of the front radiating beads 26, excluding the two central front radiating beads 26, are spaced from the front edge of the center bead 22 via a planar section 20B having a width (fore and aft dimension) d which is not formed with a bead. Likewise, the two of the rear radiating beads 28 that adjoin each other at the laterally central part of the hood frame 20 are joined to each other at the center bead side ends thereof such that the shape of letter-V is defined as seen in FIG. 1. The center bead ends of the rear radiating beads 28, excluding the two central front radiating beads 28, are spaced from the rear edge of the center bead 22 via a planar section 20B having a width (fore and aft dimension) d which is not formed with a bead.

Similarly as the center bead 22, the cross sectional shape of each of the front radiating beads 26 and rear radiating beads 28 is formed by a flat top section 27 having a lateral width of b and a pair of quarter circles 25 arranged symmetrically on either side of the flat top section 27 as shown in FIG. 3.

Therefore, the cross sectional shape defines a semicircle (arch) having a bead height h corresponding to the radius r of the quarter circles 25. Each quarter circle 25 defines an arc extending over a 90 degree angle, and circumscribes an isosceles right triangle defining an elevation angle of 45 degrees. The width of the open end of the center bead 22 is therefore given by (2r+b) similarly as the center bead 22.

The hood frame 20 is bonded to the back side 10A of the hood skin 10 by strips of a bonding agent (such as mastic sealer) layer 25 applied to the flat top sections 27 of the center bead 22, the front radiating beads 26 and the rear radiating beads 28. The lateral width of the flat top sections 27 of the center bead 22, the front radiating beads 26 and the rear radiating beads 28 which define bonding portions for the hood skin 10 is required to be adequately broad for applying the bonding agent, but is desired to be minimized in order to avoid the reduction in the overall stiffness, and is preferably 10 mm or less. The bonding is not required to be achieved on the entire surface of the flat top sections 27 of the center bead 22, the front radiating beads 26 and the rear radiating beads 28, but may also be achieved only in parts thereof.

The hood frame 20 includes a dimple 30 formed in each of planar sections where no bead is formed over a relatively large area such as those found in the laterally and longitudinally middle points along the outer periphery of the hood frame 20 for the purpose of ensuring an appropriate out-of-plane stiffness of each planar section. Such dimples 30 include those formed in the planar sections each having a lateral width c on either lateral end of the center bead 22, the one formed between the two central front radiating beads 26 that are connected to each other at the connecting part 26A, and the one formed between the two central rear radiating beads 28 that are connected to each other at the connecting part 28A. Each dimple 30 consists of a semispherical projection projecting toward the back side 10A of the hood skin 10 and having a flat top portion, and is bonded to the back side 10A of the hood skin 10 by means of a bonding agent (such as mastic sealer) layer applied to the flat top portion.

In the structure discussed above, each of the center bead 22, the front radiating beads 26 and the rear radiating beads 28 demonstrates a greater stiffness with respect to the lengthwise direction thereof as compared to the planar sections 20A owing to the cross sectional shape thereof, and all of the beads 22, 26 and 28 jointly impart a required out-of-plane stiffness to the entire hood frame 20. As these beads 22, 26 and 28 extend linearly and increase the stiffness in the lengthwise direction thereof so that these beads provide favorable paths of load transmission of the force acting vertically onto the hood, in particular the initial acceleration load in a highly responsive manner.

A downward load acting from the hood skin 10 upon the hood frame 20 via the bonding agent layer 24 is widely distributed by being transmitted from the central region to the peripheral region of the hood frame 20 along the length of each of the center bead 22, the front radiating beads 26 and the rear radiating beads 28 as indicated by the arrows in FIG. 1.

The center bead 22 transmits and distributes the vertical load on the hood to the laterally outer parts thereof, and also passes the load to the front radiating beads 26 and the rear radiating beads 28 that are arranged laterally. After being distributed to the front radiating beads 26 and the rear radiating beads 28, the vertical load on the hood is further distributed to the periphery of the hood via the front radiating beads 26 and the rear radiating beads 28, and is favorably and quickly transmitted to a plurality of members provided along the periphery of the front hood via the hinges 12, the mounting part of the striker 14 and the elastic support members which support the front hood 1 on the vehicle body.

Because the planar section 20A having the lateral width c is provided between each lateral end of the center bead 22 and the opposing side edge of the hood frame 20, the out-of-plane stiffness of the hood frame 20 in this region can be optimized.

The relatively broad planar sections where no bead is formed are each formed with a dimple so that the out-of-plane stiffness of such planar sections can be optimized.

The planar sections 20B provided between the center bead 22 and the front radiating beads 26 and between the center bead 22 and the rear radiating beds 28 each having the fore and aft width d contribute to favorable load absorption by undergoing a tensile deformation when a downward crash load is applied to the front hood.

Because the center bead side ends of the two mutually adjoining laterally central front and rear radiating beads 26 and 28 are joined at the connecting portions 26A and 28A thereof, a downward crash load that may be applied to the front hood can be distributed over the entire area of the hood frame 20, in particular in the lateral direction, in a favorable manner.

Owing to these factors, a downward crash load that may be applied to the front hood can be distributed to the entire area of the front hood so that the downward deformation of the hood frame 20 under the downward crash load can be controlled (reduction of the crash stroke) and the HIC can be set at an appropriate level at the same time while allowing much freedom in design.

As a result, while ensuring an appropriate HIC level, the downward deformation of the hood frame 20 can be controlled so that the crash stroke can be reduced as compared to the conventional arrangement, and any increase in the height of the front hood which may cause impairment of the front visibility and the aerodynamic properties can be avoided.

The foregoing structure allows the downward crash load on the front hood 1 to be distributed favorably without regard to the location of the point of the application of the crash load including the regions where no bead is formed, and the following discussion explains how it can be accomplished.

Figure 4:
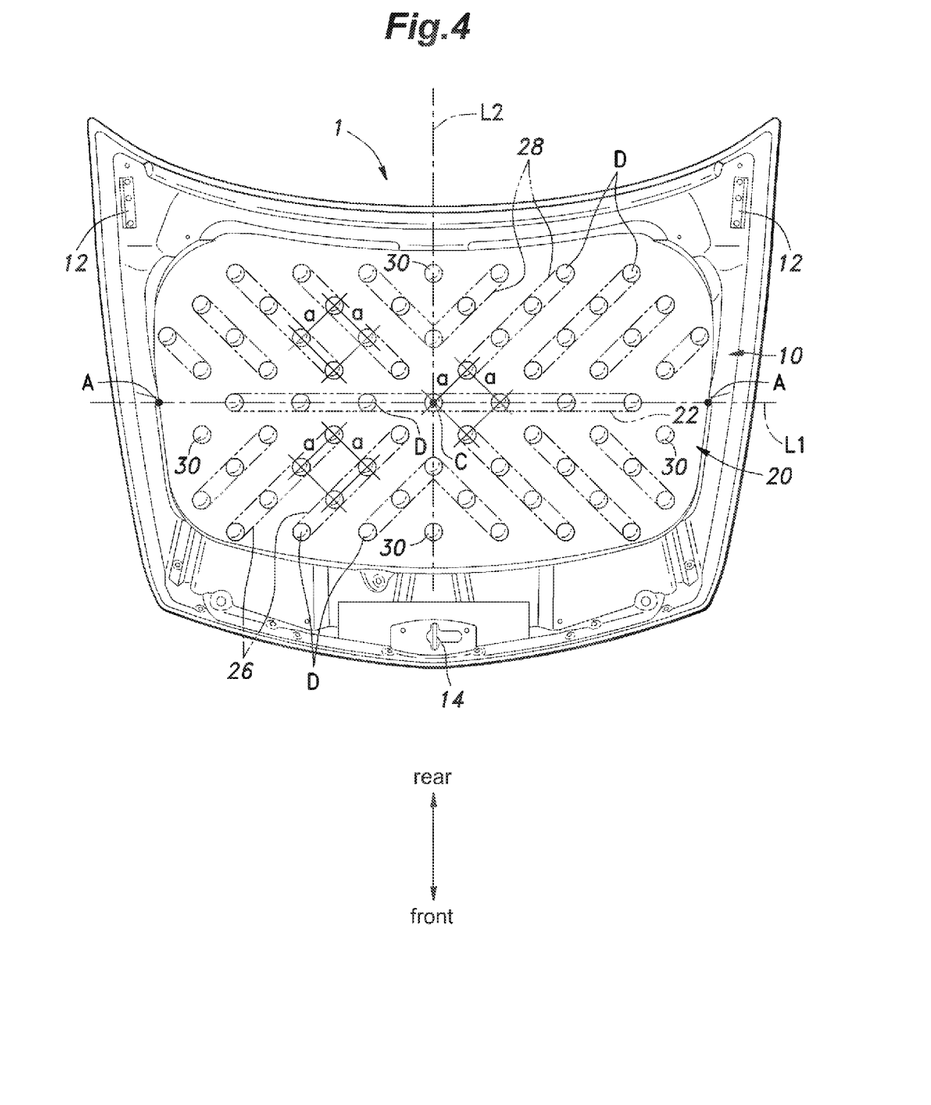
FIG. 4 is a view illustrating a design principle of the vehicle front hood structure embodying the present invention.

Referring to FIG. 4, suppose that the center bead 22, the front radiating beads 26 and the rear radiating beads 28 are formed by connecting dimples D that are arranged along the lengthwise direction of each bead. On the assumption that the front hood 1 is caused to bend in the middle in the shape of inverted letter-V by the load of a frontal crash, the dimples D are arranged at an equal spacing between adjacent ones (dimple pitch) by placing the starting point at the intersection C between a connecting line L1 connecting a pair of folding points A defined centrally in a fore and aft direction on either side edge of the hood frame 20 and a laterally central line L2 outwardly in either lateral direction. Based on this assumption, without regard to the point of application of the vertical load on the front hood including the regions of the hood frame 20 where no bead is formed, the load can be distributed evenly over the surrounding area.

$$\epsilon_{max} = -\mu \cdot wa^2/D$$

$$D = Et^3/12(1-v^3)$$

where $\epsilon_{max}$: maximum deflection of the hood frame when a concentrated load w is applied to a minimum rectangular area having four corners defined by adjoining four dimples D: bending stiffness of the hood frame E: bending elastic modulus of the hood frame v: Poisson ratio of the hood frame a: the length of the short side of the minimum rectangle
t: plate thickness of the hood frame
μ: shape factor When the long side and the short side of the minimum rectangle both have an equal length a, the shape factor μ is given by 0.001160. Given the required concentrated load w, the plate thickness t and the material of the hood frame 20, the optimum dimple pitch a can be determined. According to the obtained optimum dimple pitch a, the lateral pitch of the front and rear radiating beads 26 and 28 as well as the width d can be optimally selected.

In this manner, the front and rear radiating beads 26 and 28 are arranged in parallel to one another at a regular interval in the lateral direction.

The cross sectional shape of each of the center bead 22 and the front and rear radiating beads 26 and 28 most preferably consists of a semicircle characterized by an elevation angle of 60 to 30 degrees, in particular an elevation angle of 45 degrees as shown in FIG. 3 in achieving an appropriate out-of-plane stiffness of the front hood 1 without causing concentration of stress at the base portion of each bead, and distributing the load from each bead portion to the adjacent planar portion.

If the elevation angle is less than 30 degrees, stress tends to concentrate in the lower end (foot portion) of the bead so that excessive strain or cracks may be produced in this region, and an adequate durability may not be achieved. If the elevation angle is greater than 60 degrees, the contact area between the hood skin 10 and the hood frame 20 becomes so great that the overall stiffness of the hood may be compromised. Also, the resulting increase in the distance between the contact area and the lower end of each bead may cause an increase in the crash stroke owing to the loss in the load transmission to the flat surfaces (planar section 20A) of the hood frame 20.

At the time of a frontal crash, if there is no center bead 22, typically, the front hood 1 initially bends into the shape of inverted letter-V as a buckling deformation about a folding line extending laterally in a front fringe region of the hood frame 20, and then bends into the shape of inverted letter-V as a buckling deformation about a folding line extending laterally in a rear fringe region of the hood frame 20.

Figure 5:
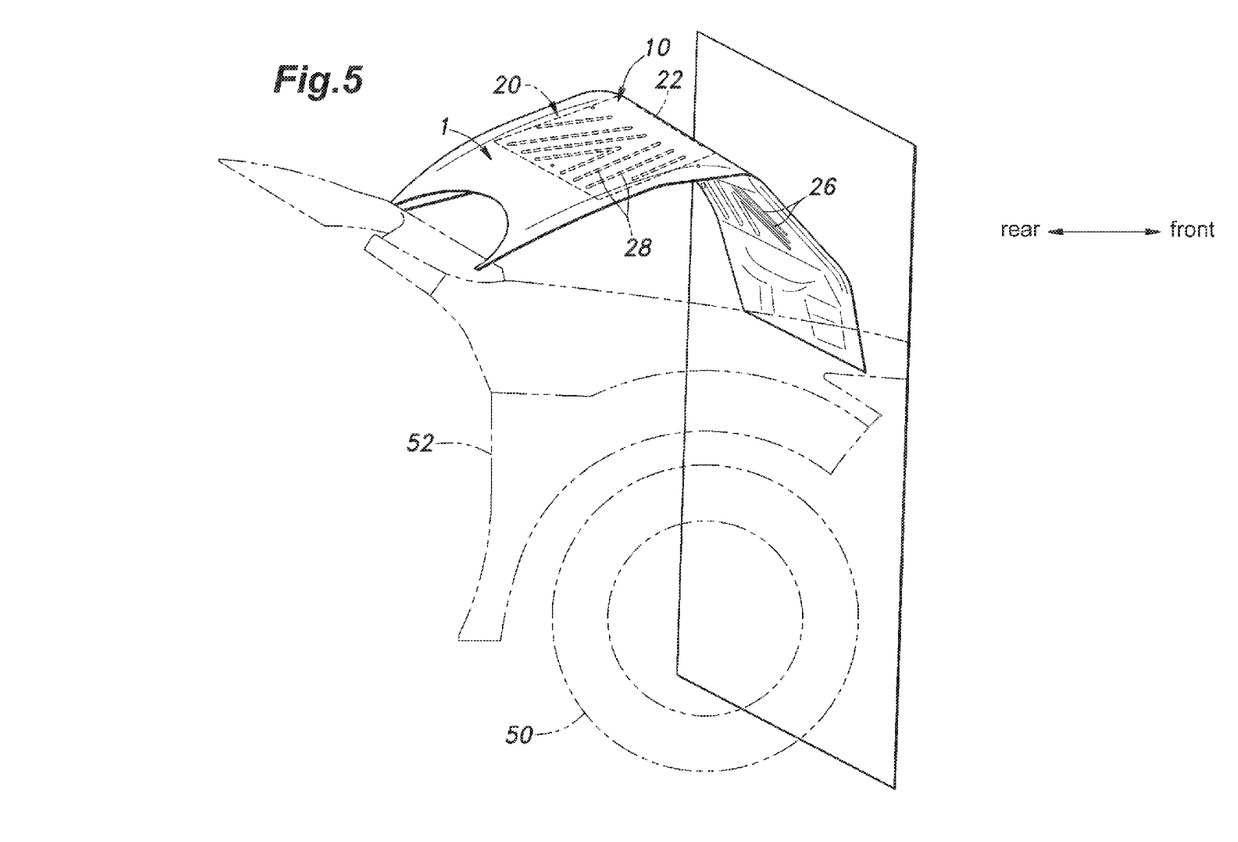
FIG. 5 is a perspective view of the vehicle front hood structure embodying the present invention following a frontal crash.

On the other hand, when the hood frame 20 includes the center bead 22 extending laterally and linearly and the planar sections 20A between the center bead 20 and the front radiating beads 26 and between the center bead 20 and the rear radiating beads 28, owing to the increased stiffness of the regions adjacent to the front and rear radiating beads 26 and 28, at the time of a frontal crash, the front hood 1 initially bends into the shape of inverted letter-V as a buckling deformation about a folding line extending laterally in a front fringe region of the hood frame 20, and then bends significantly into the shape of inverted letter-V as a buckling deformation about a folding line extending along and through the center bead 20 before bending into the shape of inverted letter-V as a buckling deformation about a folding line extending laterally in a rear fringe region of the hood frame 20 as shown in FIG. 5.

The bending about the center bead 22 causes a favorable absorption of the crash energy. As the planar sections 20A between the center bead 20 and the front radiating beads 26 and between the center bead 20 and the rear radiating beads 28 each having a fore and aft dimension of d demonstrate a relatively low mechanical strength thereof, at the time of a frontal crash, a buckling deformation is caused to the planar sections 20A such that a favorable absorption of the crash energy is achieved.

On account of these factors, at the time of a frontal crash, the front hood 1 is prevented from intruding into the cabin of the vehicle, and the space within the cabin is safeguarded in a highly reliable manner.

The front and rear radiating beads 26 and 28 having a high stiffness provide a high resistance to a light loading so that the sagging of the front hood 1 under its own weight when propped up in an open state by an open stay (not shown in the drawings) can be minimized.

In FIG. 5, numeral 50 denotes a front tire, and numeral 52 denotes a front side fender.

Although the present invention has been described in terms of a preferred embodiment thereof, it is obvious to a person skilled in the art that various alterations and modifications are possible without departing from the scope of the present invention which is set forth in the appended claims.

Figure 6:
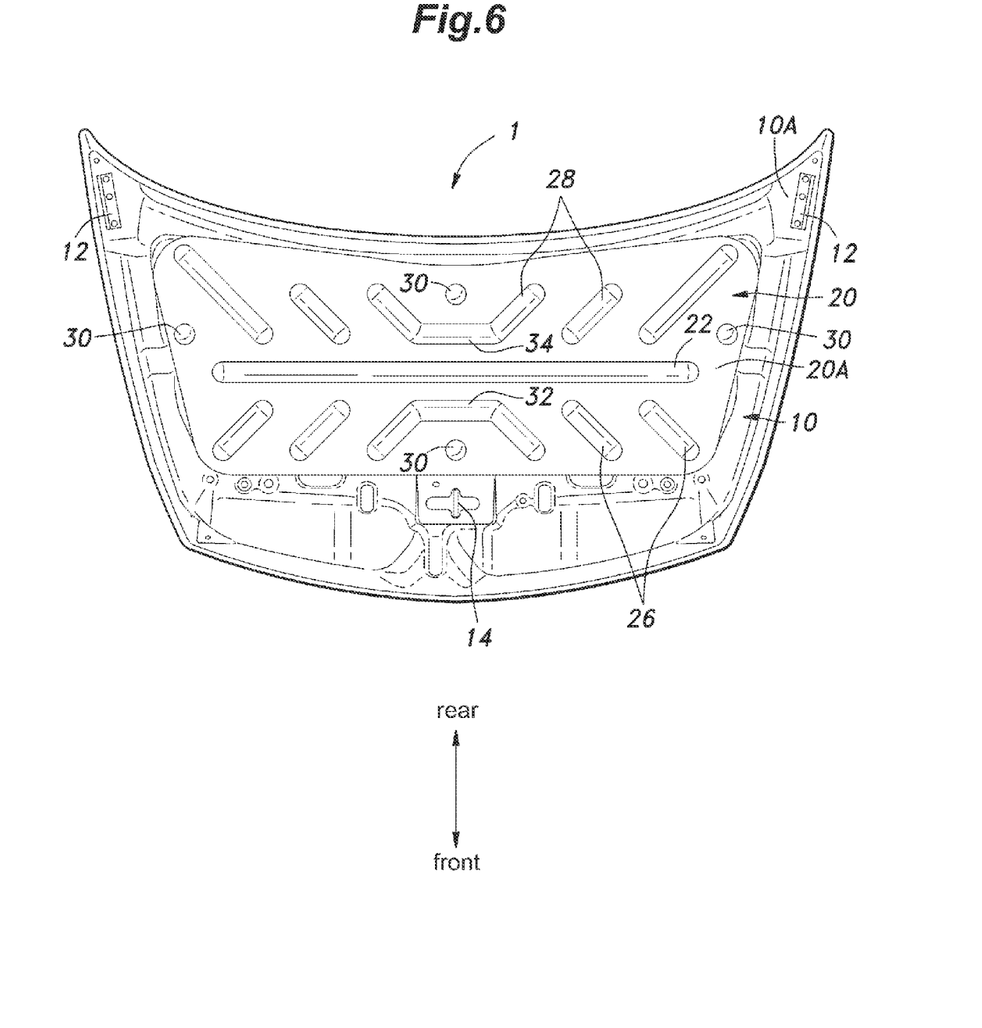
FIG. 6 is a plan view of the back side of a hood in a vehicle front hood structure according to another embodiment of the present invention.

The bead arrangement for the front hood 1 is not limited to that shown in FIG. 1. For instance, when the fore and aft dimension of the front hood 1 is small, the two of the front radiating beads 26 in the center and the two of the rear radiating beads 28 in the center may be connected to each other by laterally extending linear connecting bead 32 and 34, respectively. Owing to the connecting beads 32 and 24, a downward load acting upon the hood, in particular a downward load acting upon the laterally central part of the hood can be also favorably distributed to the entire area of the hood frame 20.

The center bead 22 may consist of at least a single bead, and, as required, may consist of a plurality beads arranged in the fore and aft direction at a prescribed interval.

The various components included in the foregoing embodiment are not necessarily indispensable, but some of the components may by omitted as required without departing from the spirit of the present invention.

The contents of the original Japanese patent application (Japanese patent application serial number 2011-45696) on which the Paris Convention priority claim is made for the present application as well as the contents of the prior art references mentioned in this application are incorporated in this application by reference.

GLOSSARY 1 front hood
10 hood skin
20 hood frame
22 center bead
26 front radiating bead
28 rear radiating bead
30 dimple

The invention claimed is:

1. A vehicle front hood structure, comprising a hood skin and a hood frame attached to a back side of the hood skin, the hood frame comprising:
   a center bead projecting toward the hood skin and extending from an intersection between a connecting line connecting a pair of folding points defined centrally in a fore and aft direction on either side edge of the hood frame and a laterally central line outwardly in either lateral direction; and
   a plurality of radiating beads projecting toward the hood skin and extending diagonally both in front of and behind the center bead in a diagonal direction of the hood frame,
   wherein the hood frame includes a planar section having a prescribed width and not formed with a bead which is located between the center bead and an opposing end of each radiating bead.

2. The vehicle front hood structure according to claim 1, wherein the center bead and/or the radiating beads are given with a semicircular cross section.

3. The vehicle front hood structure according to claim 1, wherein the center bead extends continuously in the lateral direction.

4. The vehicle front hood structure according to claim 1, wherein the hood frame includes a second planar section having a second prescribed width and not formed with a bead which is located between each lateral end of the center bead and an opposing side edge of the hood frame.

5. The vehicle front hood structure according to claim 1, wherein the hood frame includes a connecting portion at which a laterally adjoining pair of the radiating beads in a laterally central part of the hood frame is connected to each other.

6. The vehicle front hood structure according to claim 1, wherein the hood frame includes a dimple formed in a region which is not provided with a bead and located in a laterally and/or longitudinally central part along an outer periphery of the hood frame.

7. The vehicle front hood structure according to claim 2, wherein the center bead extends continuously in the lateral direction.

8. The vehicle front hood structure according to claim 2, wherein the hood frame includes a second planar section having a second prescribed width and not formed with a bead which is located between each lateral end of the center bead and the opposing side edge of the hood frame.

9. The vehicle front hood structure according to claim 3, wherein the hood frame includes a second planar section having a second prescribed width and not formed with a bead which is located between each lateral end of the center bead and the opposing side edge of the hood frame.

10. The vehicle front hood structure according to claim 2, wherein the hood frame includes a connecting portion at which a laterally adjoining pair of the radiating beads in a laterally central part of the hood frame is connected to each other.

11. The vehicle front hood structure according to claim 3, wherein the hood frame includes a connecting portion at which a laterally adjoining pair of the radiating beads in a laterally central part of the hood frame is connected to each other.

12. The vehicle front hood structure according to claim 4, wherein the hood frame includes a connecting portion at which a laterally adjoining pair of the radiating beads in a laterally central part of the hood frame is connected to each other.

13. The vehicle front hood structure according to claim 2, wherein the hood frame includes a dimple formed in a region which is not provided with a bead and located in a laterally and/or longitudinally central part along an outer periphery of the hood frame.

14. The vehicle front hood structure according to claim 3, wherein the hood frame includes a dimple formed in a region which is not provided with a bead and located in a laterally and/or longitudinally central part along an outer periphery of the hood frame.

15. The vehicle front hood structure according to claim 4, wherein the hood frame includes a dimple formed in a region which is not provided with a bead and located in a laterally and/or longitudinally central part along an outer periphery of the hood frame.

16. The vehicle front hood structure according to claim 5, wherein the hood frame includes a dimple formed in a region which is not provided with a bead and located in a laterally and/or longitudinally central part along an outer periphery of the hood frame.

* * * * *